Patented Sept. 5, 1944

2,357,691

UNITED STATES PATENT OFFICE 2,357,691

HYDROCARBON CONVERSION

Robert F. Ruthruff, Chicago, Ill., assignor to Process Management Company, Inc., New York, N. Y., a corporation of Delaware No Drawing. Application May 31, 1940,
Serial No. 338,045

4 Claims. (Cl. 260—673.5)

This invention relates to the dehydrogenation of hydrocarbons by means of chromium oxide catalysts. More particularly, the invention relates to dehydrogenation of hydrocarbons by means of chromium oxide catalysts of the gel type prepared under conditions effective to impart superior activity to the catalyst.

Chromium oxide catalysts alone or in combination with suitable supporting materials or promoters have been employed for the dehydrogenation of normally gaseous and normally liquid hydrocarbons. The preparation of chromium oxide catalysts for such reactions by the formation of chromium oxide gels and the drying of such gels has been proposed previously. Catalysts thus prepared are referred to as gel-type catalysts. In the preparation of such catalysts it is customary to effect precipitation of the hydrous oxide or hydroxide from an aqueous solution of chromium nitrate by means of ammonium hydroxide. The precipitation is effected under carefully controlled conditions to insure formation of the gel structure necessary for the production of an active catalyst from the precipitate. The use of chromium chloride has been avoided since it has been found that a more active catalyst is prepared from the nitrate. The precipitated gel is ordinarily separated from supernatant liquid and then thoroughly washed in water to effect as completely as possible the removal of adsorbed salts which may be deleterious to the activity of the resulting catalyst.

I have discovered that catalysts exhibiting superior dehydrogenating activity may be prepared under conditions wherein the precipitated gel, prior to drying thereof, is intimately contacted with an aqueous solution in which the negative ions, aside from the hydroxyl ions, essentially consist of ions selected from the group consisting of sulfate ions, carbonate ions and acetate ions. The intimate contact of the precipitated gel with a solution of this character may be effected by precipitating the gel from a solution of the appropriate chromium salt such as chromium acetate, or a gel precipitated from a solution of a salt containing an ion other than those specified, such as chromium nitrate, may be thoroughly digested, after removal of supernatant liquid, with an aqueous solution containing the appropriate ion, such as a solution of ammonium carbonate.

The superior dehydrogenating activity of the gel-type chromium oxide catalysts prepared in accordance with this invention may be explained by the assumption that carbonate ions, sulfate ions and acetate ions are either less harmful, or more favorable, to the activity of the catalyst than the nitrate ion, or are more easily removed by washing or heating. The beneficial effect of digesting, in a solution containing one or more of the specified ions, a gel precipitated from a solution other than one containing these ions, such as a chromium nitrate solution, may be explained by the assumption that such digestion effects desorption of the nitrate ions or other less favorable ions in favor of the carbonate ions, the sulfate ions or the acetate ions, as the case might be. It should be understood, however, that the invention is not to be limited by such theoretical considerations which are offered merely in explanation of the mechanism by which the beneficial effects of the present invention are obtained.

The invention will be described further by reference to specific examples of the preparation of gel-type chromium oxide catalysts and comparative tests of catalysts prepared by the different methods. It should be understood, however, that the invention is not limited by such specific examples but is broader in scope and capable of many other modifications within its scope.

In the preparation of catalysts for testing to illustrate the advantages of the invention the same general method of preparation was employed with such variations as are necessary by reason of differences in the reactants employed and by the employment or non-employment of the digestion step. The method of preparation employed will be illustrated by a description of the method employed in preparing a gel-type chromium oxide catalyst from a chromium nitrate solution. The preparation of the other catalysts will be described by reference to this method of preparation.

A 0.2 N solution (against alkali) of chromium nitrate was prepared by dissolving 152.4 grams of the nonahydrate in 6 liters of water. An ammonia solution of the same normality was prepared by diluting 77 cc. concentrated (29%) ammonium hydroxide with 6 liters of water. The chromium solution was rapidly stirred and the dilute alkali was added dropwise at a rate of 6 cc. a minute until 3 liters had been used. At this point addition of alkali was discontinued and the solution was stirred for 4 hours, following which the addition of alkali at the above rate was resumed. After a permanent precipitate had formed the remainder of the alkali was added rather rapidly.

The gelatinous precipitate was allowed to settle and the supernatant liquid was removed as completely as possible, following which sufficient distilled water was added to bring the level up to the previous mark and the suspension was stirred for a half hour, allowed to settle, and the supernatant liquid was again removed. This method of washing was continued until the precipitate began to peptize, about six changes of water being required.

The washed precipitate was sucked as dry as possible on a Büchner filter and then transferred to an oven, where it was kept at 210–220° F. for 24 hours. Before use the catalyst was stabilized by bringing it up to 572 F. over a course of 5 hours, following which it was maintained at this temperature for 10 hours.

Due to variations in the water content of chromium nitrate nonahydrate, more or less than the specified amount of dilute alkali may be required for complete precipitation. The amount of nonahydrate specified above is based on the actual composition of the sample used.

In the further description of the invention the catalyst prepared in accordance with the foregoing example is referred to as the nitrate catalyst.

Another catalyst, which may be designated as the chloride catalyst, was prepared in accordance with the foregoing method with the use of chromium chloride instead of chromium nitrate. In this preparation the gel precipitate peptized after six washings.

Another catalyst, which may be designated as the acetate catalyst, was prepared in accordance with the method illustrated by substituting chromium acetate for chromium nitrate. The gel precipitate obtained from this material peptized after five washings.

Another catalyst, which may be designated as the sulfate catalyst, was prepared in accordance with the foregoing method by substituting chromium sulfate for chromium nitrate.

Another catalyst, which may be designated as the nitrate-sulfate catalyst, was prepared in accordance with the foregoing example except that after removal of the supernatant liquid from the precipitated gel the supernatant liquid was replaced by a 5% solution of ammonium sulfate. The mixture of gel and ammonium sulfate solution was stirred for one hour after which the catalyst was washed as usual, 8 changes of water being used.

Another catalyst, which may be designated as the nitrate-carbonate catalyst, was prepared in accordance with the procedure described above except that after removal of the supernatant liquid from the precipitated gel the supernatant liquid was replaced by a 5% ammonium carbonate solution. After stirring this mixture for one hour the catalyst was washed in the usual manner.

The catalysts prepared as described above were tested for relative activity in the dehydrogenation of heptane. In each of these tests heptane was passed over the granular catalyst at atmospheric pressure and at a temperature of 890° F. The heptane was passed over the catalyst at a space velocity of one volume (liquid) of heptane per volume of catalyst space per hour. Each test run was continued for five hours, at the end of which time the catalyst was revivified prior to the following test run. The products of the reaction were separated into liquid and gases, and the volume of the gases produced was measured. In all cases the gases consisted substantially of hydrogen, to the extent of 90% or more. The liquid product from each half of each 5-hour run was separately collected, and selected specimens of the liquid product thus obtained were tested for their content of aromatic hydrocarbons (toluene) and olefinic hydrocarbons (heptene).

During each test run the rate of gas production declined progressively as a result of temporary deactivation of the catalyst caused by the deposition of carbonaceous materials. In order to remove such deposits and restore activity the catalysts were revivified after each test run by burning off the carbon collected on the surface. This was done by passing over the catalyst nitrogen containing 0.5% of oxygen. Following revivification the catalysts were activated by contacting them with hydrogen to remove adsorbed oxygen and avoid the formation of oxygenated products during the following test run.

The results of the tests of the above-described catalysts in accordance with the method described are given in the following table in which the figures opposite the run numbers represent the relative volumes of gas produced in the 5-hour test runs.

Table

| Run | Chloride catalyst | Nitrate catalyst | Nitrate-sulfate catalyst | Nitrate-carbonate catalyst | Sulfate catalyst | Acetate catalyst |
|---|---|---|---|---|---|---|
| 1 | 9,090 | 10,960 | 9,970 | 13,070 | 10,540 | 17,060 |
| 2 | 9,010 | 10,820 | 11,590 | 13,550 | 14,020 | 16,050 |
| 3 | 9,260 | 12,180 | 12,500 | 13,920 | 13,910 | 14,780 |
| 4 | 8,810 | 10,200 | 13,250 | 14,260 | 13,830 | 14,300 |
| 5 | 8,950 | 10,400 | 13,100 | 14,550 | 13,550 | 15,150 |
| 6 | | 10,030 | 12,380 | 11,850 | 13,790 | 14,270 |
| 7 | | 11,620 | 12,500 | 13,210 | 13,820 | 14,330 |
| 8 | | 10,320 | 12,150 | 12,500 | | 13,080 |
| 9 | | 9,660 | | | | 13,740 |
| 10 | | 10,180 | | | | 14,850 |
| 11 | | 10,260 | | | | 13,930 |
| 12 | | | | | | 13,910 |
| Aver. | 9,024 | 10,585 | 12,180 | 13,364 | 13,351 | 14,621 |
| Aver. after three runs | 8,880 | 10,334 | 12,676 | 13,251 | 13,748 | 14,173 |
| Activity index | 85 | 100 | 123 | 128 | 133 | 137 |

In the table under each catalyst there is given also the average relative volume of gas produced in the 5-hour test runs on that catalyst. In order to indicate the relative activities of the catalysts after they have been stabilized by several runs there is given also for each catalyst the average relative volume of gas produced per 5-hour test run after the first three runs.

The average volume of gas produced by the four catalysts prepared in accordance with the present invention indicates a substantial superiority in activity of these catalysts over the chloride catalyst and the nitrate catalyst. When one considers the stabilized activity of the catalysts, as indicated by the relative average gas production after the first three runs, the superiority in favor of the catalyst produced in accordance with the present invention is accentuated. This is indicated by the acivity index, based on the activity of the nitrate catalyst.

The superiority of the catalysts of the present invention is indicated by the relative volumes of gas produced and also by the degree of unsaturation of the liquid products. The liquid product of the first 2.5 hours of the first run on the chloride catalyst contained 12.2% olefins and 8.7% aromatics. The liquid product of the first 2.5 hours of Run No. 7 on the nitrate catalyst contained 12.9% olefins and 9.5% aromatics. The liquid product of the last 2.5 hours of this run contained 6.8% olefins and 0.8% aromatics. On the other hand, in the practice of the present invention as exemplified by Run No. 11 on the acetate catalyst the liquid product of the first 2.5 hours contained 16.1% olefins and 11.2% aromatics. The liquid product of the last 2.5 hours of this run contained 10.2% olefins and 2.5% aromatics. A further example of the advantage of the present invention is found in Run No. 7 on the sulfate catalyst wherein the liquid product of the first 2.5 hours contained 12.8% olefins and 12.1% aromatics. In this run the liquid product of the last 2.5 hours contained 8.5% olefins and 2.6% aromatics. Another example is afforded by Run No. 4 on the nitrate-sulfate catalyst wherein the liquid product of the first 2.5 hours contained 13.8% olefins and 11.2% aromatics. The product of the last 2.5 hours of this run contained 8.9% olefins and 3.5% aromatics. Another example is found in Run No. 5 on the nitrate-carbonate catalyst wherein the liquid product of the first 2.5 hours contained 14.4% olefins and 12.8% aromatics. The liquid product of the last 2.5 hours of this run contained 10.5% olefins and 3.6% aromatics. These data indicate a stabilized rate of production of olefins and aromatics in the 5-hour runs on the nitrate-carbonate, nitrate-sulfate, sulfate and acetate catalysts which is 20% and 40%, respectively, greater than in the 5-hour runs on the nitrate catalyst.

The foregoing data indicate that the process of the present invention is of particular advantage in the conversion of aliphatic hydrocarbons containing at least six carbon atoms per molecule to aromatic hydrocarbons. In carrying out the conversion of aliphatic hydrocarbons to aromatic hydrocarbons the hydrocarbons are contacted with the catalyst at temperatures within the range of 575° to 1100° F. (preferably 850° to 1025° F.) at a space velocity which, while sufficient to effect production of aromatics at a substantial rate, is sufficiently low to produce a substantial proportion of aromatics in the liquid product. In the temperature range mentioned the rate of conversion of aliphatic hydrocarbons to aromatic hydrocarbons varies inversely to the space velocity and directly with the temperature. At low temperatures within this range, therefore, a low space velocity should be employed while at higher temperatures a higher space velocity may be used although these factors are governed also by the character of the material treated and the nature of the product desired. In general, the space velocities employed in this temperature range will fall within the range of 0.1 to 3 volumes of aliphatic hydrocarbons (liquid basis) per volume of catalyst space per hour. The most advantageous space velocities will be found in the range of 1 to 2 volumes of liquid per volume of catalyst per hour.

Referring again to the table, it will be noted that the first runs on the sulfate catalyst and the nitrate-sulfate catalyst exhibited a gas production substantially lower than the rate of gas production at which these catalysts became stabilized after several test runs. This suggests that sulfate ions were present on these catalysts as prepared and were removed by the temperatures employed in the first operating run or subsequent revivification treatment.

The foregoing examples and data illustrate various aspects and modifications of the invention. It should be understood, however, that the invention is not limited to such specific modifications but is applicable to the use of catalysts prepared by other methods within the scope of the invention and to the treatment of normally gaseous hydrocarbons and normally liquid hydrocarbons other than heptane for dehydrogenation and/or cyclization thereof.

I claim:

1. A process for dehydrogenating hydrocarbons which comprises contacting said hydrocarbons at elevated temperature with a chromium oxide catalyst prepared by drying a chromium oxide gel obtained by precipitation in an aqueous chromium acetate solution substantially free from negative ions other than hydroxyl ions, sulfate ions, carbonate ions and acetate ions.

2. A process for converting aliphatic hydrocarbons to aromatic hydrocarbons which comprises contacting aliphatic hydrocarbons having at least six carbon atoms per molecule with a chromium oxide catalyst prepared by drying a chromium oxide gel obtained by precipitation in an aqueous chromium acetate solution substantially free from negative ions other than hydroxyl ions, sulfate ions, carbonate ions and acetate ions, at a temperature of 575° to 1100° F., and at a space velocity sufficiently low to effect substantial conversion of said aliphatic hydrocarbons to aromatic hydrocarbons.

3. A process for dehydrogenating hydrocarbons which comprises contacting said hydrocarbons at elevated temperature with a catalyst comprising chromium oxide, prepared by drying a chromium oxide gel obtained by precipitation in an aqueous chromium acetate solution substantially free from other negative ions except hydroxyl ions.

4. A process for converting aliphatic hydrocarbons to aromatic hydrocarbons which comprises contacting aliphatic hydrocarbons having at least six carbon atoms per molecule with a catalyst comprising chromium oxide, prepared by drying a chromium oxide gel obtained by precipitation in an aqueous chromium acetate solution substantially free from other negative ions except hydroxyl ions, at a temperature of 575° to 1100° F. and at a space velocity sufficiently low to effect substantial conversion of said aliphatic hydrocarbons to aromatic hydrocarbons.

ROBERT F. RUTHRUFF.